United States Patent
Kokotov et al.

(10) Patent No.: US 7,668,702 B2
(45) Date of Patent: Feb. 23, 2010

(54) METHOD, SYSTEM AND MEDIUM FOR CONTROLLING MANUFACTURING PROCESS USING ADAPTIVE MODELS BASED ON EMPIRICAL DATA

(75) Inventors: Yuri Kokotov, Maaleh Adumim (IL); Alexander T. Schwarm, Austin, TX (US); Efim Entin, Jerusalem (IL); Jacques Seror, Jerusalem (IL); Jehuda Hartman, Rehovot (IL); Yossi Fisher, Jerusalem (IL); Arulkumar P. Shanmugasundram, Sunnyvale, CA (US); Moshe Sarfaty, Cupertino, CA (US)

(73) Assignee: Applied Materials, Inc., Santa Clara, CA (US)

( * ) Notice: Subject to any disclaimer, the term of this patent is extended or adjusted under 35 U.S.C. 154(b) by 706 days.

(21) Appl. No.: 10/377,654

(22) Filed: Mar. 4, 2003

(65) Prior Publication Data

US 2004/0015335 A1    Jan. 22, 2004

Related U.S. Application Data

(60) Provisional application No. 60/396,755, filed on Jul. 19, 2002, provisional application No. 60/422,517, filed on Oct. 31, 2002, provisional application No. 60/432,010, filed on Dec. 10, 2002.

(51) Int. Cl.
   *G06F 17/10* (2006.01)
(52) U.S. Cl. ............................................... 703/2
(58) Field of Classification Search ................ 703/2
   See application file for complete search history.

(56) References Cited

U.S. PATENT DOCUMENTS

| | | | |
|---|---|---|---|
| 3,767,900 A | 10/1973 | Chao et al. | 235/151.1 |
| 4,616,308 A | 10/1986 | Morshedi et al. | 364/159 |
| 4,663,703 A | 5/1987 | Axelby et al. | 364/149 |
| 5,347,446 A | 9/1994 | Iino et al. | 364/149 |
| 5,519,605 A | 5/1996 | Cawlfield | 364/151 |
| 5,912,678 A | 6/1999 | Saxena et al. | |
| 6,263,255 B1 | 7/2001 | Tan et al. | |
| 6,278,899 B1 | 8/2001 | Piche et al. | 700/44 |
| 6,298,470 B1 | 10/2001 | Breiner et al. | |

(Continued)

OTHER PUBLICATIONS

MacGregor et al.; Statistical Process Control of Multivariate Processes; Control Eng. Practice, vol. 3, No. 3, pp. 403-414, 1995.*

(Continued)

*Primary Examiner*—Hugh Jones
(74) *Attorney, Agent, or Firm*—Blakely, Sokoloff, Taylor & Zafman, LLP

(57) ABSTRACT

A method, system, and medium of modeling and/or for controlling a manufacturing process is disclosed. The method includes the steps of identifying one or more input parameters that cause a change in output characteristics, defining global nodes using estimated maximum and minimum values of the input parameters, and defining a mathematical equation that calculates a predicted output characteristic for each node. The method also includes the steps of receiving at least one empirical data point having one or more input parameter values and at least one empirical output value and adjusting the predicted output values at the nodes based on a difference between the at least one empirical output value and the predicted output characteristic calculated using the mathematical equation based on the one or more input parameter values.

31 Claims, 12 Drawing Sheets

U.S. PATENT DOCUMENTS

| | | |
|---|---|---|
| 6,381,564 B1 | 4/2002 | David et al. |
| 6,540,591 B1 | 4/2003 | Pasadyn et al. |
| 6,587,744 B1 | 7/2003 | Stoddard et al. |
| 6,728,587 B2 | 4/2004 | Goldman et al. |
| 2002/0128805 A1 | 9/2002 | Goldman et al. ............... 703/2 |
| 2003/0154062 A1 | 8/2003 | Daft et al. |

OTHER PUBLICATIONS

Oct. 6, 2004. Office Action for U.S. Appl. No. 10/759,108, filed Jan. 20, 2004.

Jul. 12, 2004. Office Action for U.S. Appl. No. 10/173,108, filed Jun. 8, 2002.

Dec. 1, 2003. Office Action for U.S. Appl. No. 10/173,108, filed Jun. 18, 2002.

Jul. 12, 2004. Office Action for U.S. Appl. No. 10/173,108, filed Jun. 8, 2002.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

* cited by examiner

METHOD, SYSTEM AND MEDIUM FOR CONTROLLING MANUFACTURING PROCESS USING ADAPTIVE MODELS BASED ON EMPIRICAL DATA

CROSS REFERENCES TO RELATED APPLICATIONS

This application claims priority from U.S. Provisional Application Nos. 60/396,755, filed on Jul. 19, 2002, 60/422,517, filed on Oct. 31, 2002, and 60/432,010, filed on Dec. 10, 2002.

FIELD OF THE INVENTION

The present invention relates to a method, system and medium for modeling and controlling processes (e.g., processes for manufacturing micro-electronic devices). More specifically, the present invention relates to modeling techniques adaptive to empirical data points collected during/after implementation of the processes.

BACKGROUND OF THE INVENTION

In manufacturing devices that include precision discrete devices (e.g., manufacturing microelectronic chips on silicon substrates), there is an ever growing need to improve manufacturing processes. Improving manufacturing processes may require, among other things, monitoring the characteristics of manufactured devices and adjusting input parameters (e.g., equipment controlling parameters) that influence the characteristics of the manufactured devices. A mechanism used for automatically monitoring information relating to the processing of manufactured devices and estimating the characteristics of these manufactured devices based on the adjustments to input parameters is called a process model. In turn, an automated system that makes adjustments to the input parameters as estimated by the process model and uses the adjusted input parameters to control the manufacturing processes is called a control system (or a process control system).

A conventional process model for one or more pieces of manufacturing equipment to be used in manufacturing processes is referred as a predictive model, which attempts to predict the characteristics of manufactured devices based on the input parameters. One example implementation of a conventional predictive model may use a lookup table, without using a mathematical model, to determine the best combination of input parameters to control the characteristics of manufactured devices. This technique however often requires collecting and storing an enormous corpus of experimental data obtained from numerous real-time trials. These drawbacks make this example technique a complicated, time-consuming and costly procedure.

Another conventional process model is a mathematical or formula based optimization method. This model uses numerical analyses to solve equations. More specifically, using a mathematical formula, an equation or a set of equations is used to calculate output values and arrive at the minimum of an objective function. The minimum represents an optimal solution of the objective function. More often than not, the formula is of a complex structure which may be difficult to solve. The above-described formula technique, which uses equations built on the basis of a limited number of empirical data points, can be rapid and compact. However, it is not configured to store and take into account the "history" of collected empirical data points. For example if empirical data points are collected within a small part of the total area over which monitoring and potential adjustment may be desired, the resulting correction provides a case of close fit only for the small part of the total area from which the empirical data points were collected, but when this correction is extrapolated over the total area as is widely practiced today, the resulting predictions can become inaccurate.

SUMMARY OF THE INVENTION

Embodiments of the present invention advantageously overcome the above described shortcomings of the aforementioned techniques. More specifically, embodiments of the present invention provide a system, method and medium for adaptive control models that use empirical data points.

In general, embodiments of the present invention first define an input domain, which encompasses substantially all (if not all) possible values of input parameters. The input domain can then be divided into smaller regions called cells. In each cell, extreme values are identified (e.g., nodes, representing four corners of a two-dimensional input domain). A mathematical equation, called an objective function, is minimized based on the cells and extreme values of predicted and empirical output characteristics. By minimizing the objective function, a predictive model is obtained. By minimizing a different objective function related to the output characteristics of the predictive model, a set of values for input parameters can then be obtained given a desired set of output characteristics.

The minimization process can be simplified using a set of well-understood equations for mechanical devices. In addition, a number of coefficients can be adapted in order to obtain accurate predictive models.

In particular, a method according to one or more embodiments of the present invention includes the steps of identifying one or more input parameters that cause a change in an output characteristic of a process, defining global nodes using estimated maximum and minimum values of the input parameters, and defining a mathematical equation that calculates a predicted output value for each node. The method also includes the steps of receiving at least one empirical data point having one or more input parameter values and at least one empirical output value and adjusting the predicted output values at the nodes based on a difference between the at least one empirical output value and a predicted output value calculated using the mathematical equation based on the one or more input parameter values.

BRIEF DESCRIPTION OF THE DRAWINGS

The detailed description of the present application showing various distinctive features may be best understood when the detailed description is read in reference to the appended drawings in which.

DETAILED DESCRIPTION

Embodiments of present invention generally provide systems, methods and mediums for creating one or more adaptive process models to mathematically represent multivariate input parameter systems. The present invention is particularly applicable in a manufacturing process such as manufacturing and/or processing semiconductor wafers.

Figure 1:
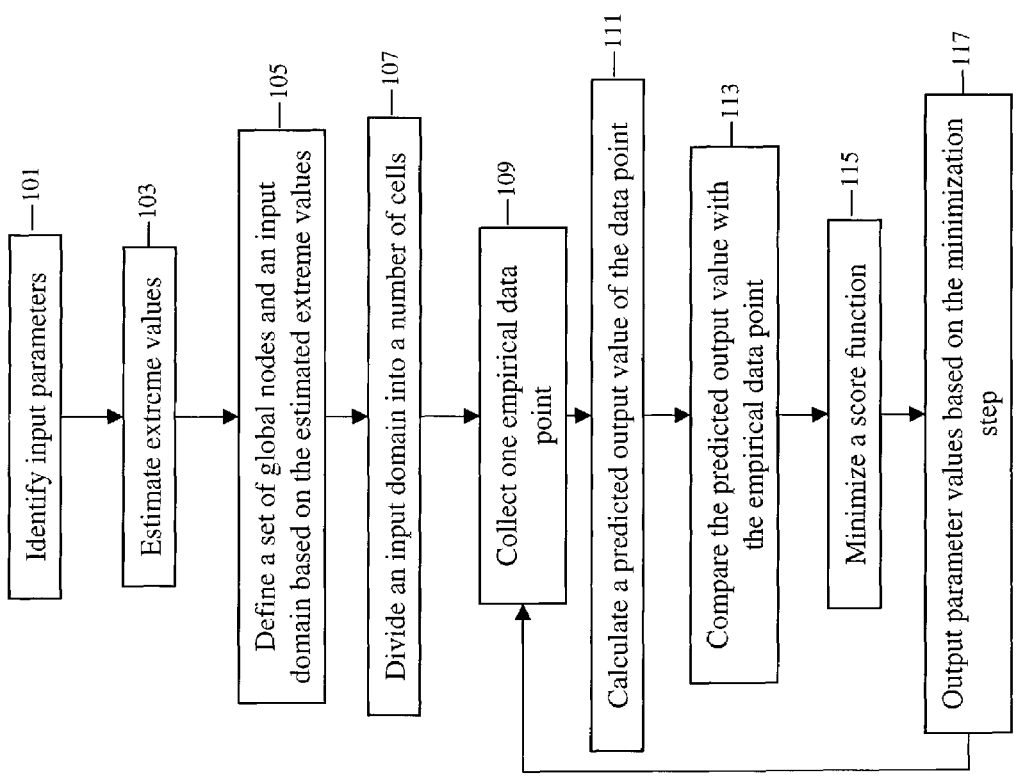
FIG. 1 is a flow chart illustrating a set of high level steps performed by embodiments of the present invention.

A set of high level steps to be performed by at least some embodiments of the present invention is illustrated in FIG. 1. Initially, one or more input parameters of a piece of processing equipment (e.g., an etcher, a depositor, etc.) to be modeled and controlled by embodiments of the present invention are identified (step 101). Once the input parameters are identified, their extreme values (e.g., the maximum and minimum values) are estimated (step 103). It should be noted that as the modeled process changes, the values of the estimated maximum and minimum may also be changed.

Based on the estimated extreme values of each input parameter, a set of global nodes is defined (step 105). (In a two-dimensional case, for example, a set of nodes can be the vertices of a rectangular box.) Substantially all input data points may fall within the global nodes. In other words, the global nodes define an input domain (step 105). In a two-dimensional input parameter space the input domain is an area, in a three-dimensional input parameter space the input domain is a volume, and so on. The input domain can be divided into a number of cells (step 107). Each cell is defined by its associated local nodes which can be shared among neighboring cells. In particular, each cell is defined by local nodes located at the extreme corners the corresponding cell. Examples of global and local nodes are described below in connection with FIG. 2. Each of the nodes (both global and local) is provided with a predicted output value as described below.

Subsequent to the above-described steps, one empirical data point is collected from the process equipment being modeled and/or controlled (step 109). When the empirical data point (having one or more input parameter values and an output value) is collected, it is placed into one of the cells based on the extreme values of the cells and the input parameter values. Within the cell into which the data point is placed, a predicted output value of the data point is calculated based on the predicted output values at the local nodes (step 111) of the cell by using, for example, a ruled interpolation method and the location of the empirical data point within the cell. The predicted output value is compared with the actual output value of the empirical data point (step 113). The difference between the predicted and actual output values is used in forming an objective function, S. An example of the objective function is as follows:

$$S = \sum_{i, \forall i} W_i (y_i^* - y_i^{predicted})^2 \qquad \text{Equation (1)}$$

with $$\min_{z_k \; \forall k} S, \text{ where}$$

$$y_i^{predicted} = \sum_{(by.all.nodes)} \alpha_{ik} z_k,$$

according to a ruled interpolation formula $W_i$—weight coefficients,
$y_i^*$—an empirical output value for empirical data point i,
$y_i^{predicted}$—an output value predicted by a ruled interpolation formula for empirical data point i,
$z_k$—an output value at node k,
$\alpha_{ik}$—coefficients that depend solely on the location of point i and node k,
i—an index for an empirical data point, and
k—an index for a node.

The difference between the predicted and the observed captured by the above equation is the smallest when the equation is minimized (Step 115). In particular, an end result of minimizing the above equation is, among others, a set of output parameter values at the nodes that yields a new predicted output value that is close to the output value of the empirical data point (step 117). This would yield optimized values of $z_k$. A predictive model is then obtained based on the optimized values of $z_k$. The predictive model can be used in obtaining values of input parameters for a desired set of output characteristics.

Steps 109 to 117 are repeated when new empirical data points are received. Although these steps are shown to operate with one empirical data point at a time, embodiments of the present invention can also operate with more than one empirical data point at a time.

Now turning to describe the above-described steps in more detail, in the step of identifying the input parameters (step 101), any, all or a combination of input parameters that may affect the output value are identified (e.g., gas pressure, electrode spacing and the like in a process for manufacturing microelectronic devices). Once the input parameters are identified, the relationship between the identified input parameters and output values can be estimated by one or more equations derived using, for instance, a multivariate regression model. The following is a list of examples for obtaining the one or more equations for initially estimating the output value: a historically known function for the same manufacturing process, a function obtained from an expert in the particular process/manufacturing field or any other known/standard set of equations.

Figure 2:
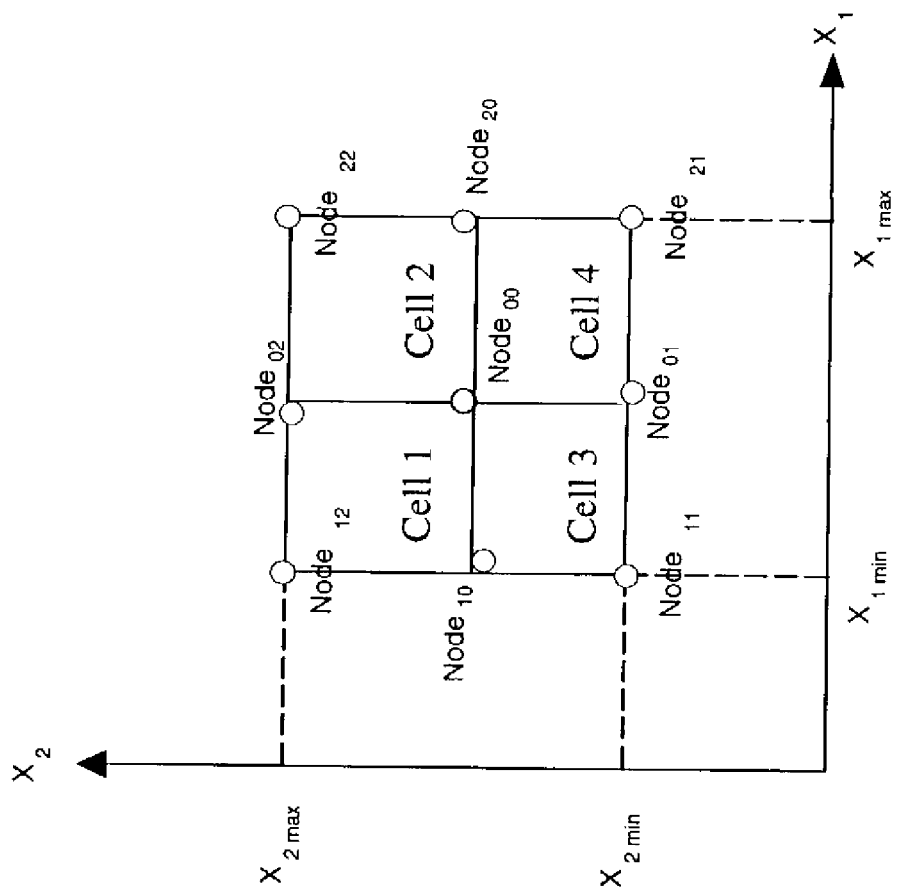
FIG. 2 is a diagram illustrating a two-dimensional input domain representing input parameters $X_1$ and $X_2$ in example embodiments of the present invention.

The step of defining the nodes and defining the input domain (step 105) as contemplated by one or more embodiments of the present invention is described by referencing FIG. 2. FIG. 2 illustrates, by way of an example, a two-dimensional input domain representing input parameters $X_1$ and $X_2$ that affect the output value. Each input parameter has a set of extreme values (e.g., a minimum value and a maximum value). In particular, input parameter $X_1$ has $X_{1max}$ as its maximum value and $X_{1min}$ as its minimum value, while input parameter $X_2$ has $X_{2max}$ as its maximum value and $X_{2min}$ as its minimum value. A set of global nodes is defined using these extreme values: $Node_{11}$ is defined by $X_{1min}$ and $X_{2min}$; $Node_{12}$ is defined by $X_{1min}$ and $X_{2max}$; $Node_{21}$ is defined by $X_{1max}$ and $X_{2min}$; and $Node_{22}$ is defined by $X_{1max}$ and $X_{2max}$. Thus, the global nodes define the input domain of the example input parameters $X_1$ and $X_2$. In other words, the input domain is bound by $Node_{11}$, $Node_{12}$, $Node_{21}$ and $Node_{22}$. It should be noted that the number of global nodes, $m_{nodes}$, for a set of parameters is equal to $2^n$, where n is the number of dimensions or the number of input parameters. For instance, at n=3 (a 3-dimensional cube), $m_{nodes}$=8; at n=7, $m_{nodes}$=128, and at n=15 $m_{nodes}$ reaches 32768. The number of global nodes increases rapidly with the increase in the number of the input parameters.

Once the input domain is defined, it can then be divided into a number of cells (also referred to as subdomains), which may provide greater precision and more adaptability to empirical data points for at least some embodiments of the present invention. The step of dividing the input domain into cells is referred as discretization. As noted above, a cell is defined by its "local" corresponding extreme values (i.e., local nodes). Still referring to FIG. 2, there are shown four example cells. Each of the cells is defined by their corresponding extreme values. For example, Cell 3 is defined by $Node_{11}$, $Node_{01}$, $Node_{00}$, and $Node_{10}$, and Cell 4 is defined by $Node_{01}$, $Node_{21}$, $Node_{20}$, and $Nod_{00}$. It should be noted that some nodes are shared by neighboring cells (for example, $Node_{01}$ and $Node_{00}$ are shared by Cell 3 and Cell 4).

As to the number of nodes, if there are three input parameters, then its input domain would include three dimensions or variables. In turn, there would be $2^3$=8 global nodes, (the number of corners of a 3-D cubicle). If each input parameter is divided into three (3) discrete areas, then the number of cells is $3^3$=27 cells each having their own 8 local nodes making a total of 64 local nodes with local nodes of adjacent cells having shared nodes. A collection of the locations of the local/global nodes can be referred to as a grid. In the example shown in FIG. 2, a grid may include the locations of $Node_{11}$, $Node_{12}$, $Node_{21}$, $Node_{01}$, $Node_{20}$, $Node_{02}$, $Node_{10}$, $Node_{22}$ and $Node_{00}$. Although the above-described embodiments show the input domain being divided into multiple cells, it should be noted that in at least some embodiments of the present invention, the entire input domain can be one cell.

Having defined the local and global nodes, one or more functions can then be assigned to each individual cell. These functions mathematically relate input parameter values and the predicted output value within their assigned cell. An example of such a function is a ruled interpolation model. For the two-dimensional cell (e.g., a cell that encompasses the entire input domain) illustrated in FIG. 2, its ruled interpolation model can be as follows:

$$y(X_1, X_2) = z_{11}(1-x_1)(1-x_2) + z_{12}(1-x_1)x_2 + z_{21}x_1(1-x_1) + z_{22}x_1x_2,$$

where $x_1 = (X_1 - X_{1\,min})/(X_{1\,max} - X_{1\,min})$, $x_2 = (X_2 - X_{2\,min})/(X_{2\,max} - X_{2\,min})$, $z_{ij}$=predicted output values at nodes ij.

In particular, given an output value at each local node, an output value of any arbitrary input parameter values can be calculated using the above equations. It should be noted that the use of the ruled interpolation model is provided herein only as an example. Embodiments of the present invention contemplate other functions known in the art. Furthermore, an additional advantage of dividing the input domain into smaller cells is that it allows assigning different functions to different cells. It should also be noted that one or more cells can be assigned to share a particular function.

When one or more functions are assigned to cells as described above, embodiments of the present invention receive an empirical data point (step 109). An empirical data point includes, at least, specific values for one or more input parameters and their corresponding output value. An objective function that relates predicted output values and the output values of the empirical data can then be devised. The objective function is then minimized as described above in connection with Equation 1.

It should be noted that in the objective function (Equation 1), i is a number of empirical data points. This objective function determines how close the predicted output value, $$y_i^{predicted},$$

is to the output value of the empirical data point, $y^{actual}$. In other words, a small value of S indicates that the predicted value is accurate. Accordingly, the objective function minimizes the difference therebetween. Ideally, the value of S may approach zero, which would mean that the prediction may approach 100% accuracy for a given set of empirical data points.

In order to differentiate critical empirical data from less critical ones, the coefficient $W_i$ in the objective function can be adjusted based on, for example, heuristic information/knowledge. For instance, in at least some embodiments of the present invention, the coefficient $W_i$ can be assigned to be as $W_i = \exp(-\lambda)(t_{current} - t_i)$, where $\lambda > 0$ is a coefficient, $t_i$ is a time point when empirical data point number i was performed, and $t_{current}$ is a current value for time. This makes the objective function respond, as precisely as possible, to the latest empirical data point, while being less responsive toward the earlier empirical data points. In addition, in at least some embodiments of the present invention, a different set of values can be assigned to the coefficient $W_i$. For instance, the coefficient Wi can be assigned to 2 for one type of product (e.g., a "golden" chip), while assigning 1 for another type of product (e.g., an "iron" chip). This means that the precision requirements for golden chips would be twice as high as those for the iron parts. Other customary/standard methods can also be used in assigning values to the coefficient $W_i$.

Figure 3:
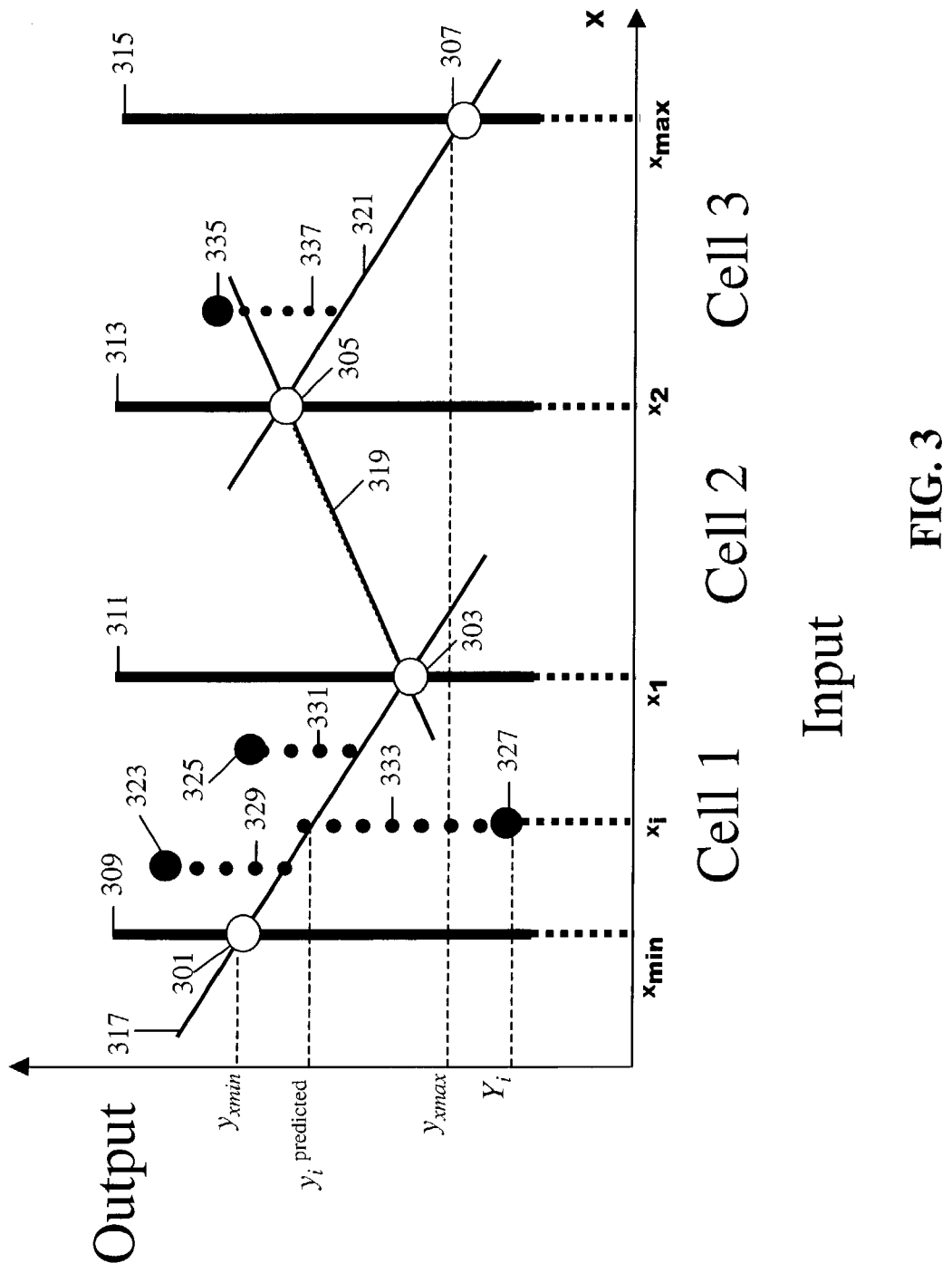
FIG. 3 is a diagram illustrating a one-dimensional virtual elastic mechanical system as contemplated by embodiments of the present invention.

Because the above described objective function can become quite complex to solve, the following describes efficient ways to solve the objective function, as contemplated by at least some embodiments of the present invention. In particular, the objective function can be solved by analogizing it to (e.g., solving it as) a multidimensional mechanical device (e.g., a virtual elastic mechanical system). Embodiments of the present invention using this analogized mechanical device are described by referencing FIGS. 3 and 4A-B. In FIG. 3, the input domain of a system having one input parameter (for modeling a manufacturing device) is depicted. In particular, its input parameter is designated as X, and its extreme values are $X_{min}$ for its minimum value and $X_{max}$ for its maximum value. Accordingly, the input domain of input parameter X is between $X_{min}$ and $X_{max}$. In addition, the input domain is divided into three cells: Cell 1, Cell 2 and Cell 3. The local nodes for Cell 1 are $X_{min}$ and $X_1$, for Cell 2 are $X_1$ and $X_2$ and for Cell 3 are $X_2$ and $X_{max}$. Output values at each of these nodes are shown along the Y-axis. For example, the output value of node $X_{min}$ is designated as $Y_{xmin}$ and, the output value of node $X_{max}$ is designated as $Y_{xmax}$.

The analogized mechanical device for the input domain illustrated in FIG. 3 includes a set of free-moving bodies (e.g., ringed-shaped bodies) 301, 303, 305, and 307 at each of the nodes. These ringed-shaped bodies can be displaced along fixed, unmovable bodies (e.g., parallel rods), 309, 311, 313 and 315 (for nodes $X_{min}$, $X_1$, $X_2$ and $X_{max}$, respectively) that are disposed orthogonally to the line representing input parameter X. As the predicted output value at each of the nodes changes, the ringed-shaped bodies may move up or down on their respective rods accordingly. A member capable of being attached to mechanical springs (e.g., a bar) is then placed between a pair of ringed-shaped bodies. For example, between the ringed-shaped bodies between 301 and 303, a bar 317 is placed. The bar 317 can be moved up or down corresponding to up or down movements of the ringed-shaped bodies 301 and 303. Empirical data points obtained are represented by points designated as, for example, 323, 325, 327 and 335. These points can be analogized to fixed hooks in the X-Y space. Onto these fixed hooks, mechanical springs can be attached. For instance, a mechanical spring 333 is connected between the empirical data point 327 and the bar 317. If there are no other empirical data points, the spring 333 would pull bar 317 in the direction of the data point 327. As more empirical data points are obtained (e.g., 323 and 325), the additional springs 329 and 331 would force the bar 317 to be located at a point of equilibrium. The point of equilibrium is where the spring forces from springs 329, 331 and 327 are equalized. Furthermore, the point of equilibrium represents an optimized model with a system of nodes and model values.

When a new empirical data point is obtained, a new fixed-body is added along with a new spring as described above in connection with FIG. 3. The corresponding bar(s) is disturbed, starts oscillating and eventually reaches its equilibrium, having incorporated the new empirical data point. As will be shown in FIG. 4A, more than one empirical data point can be used at one time to reach the equilibrium.

Figure 4A:
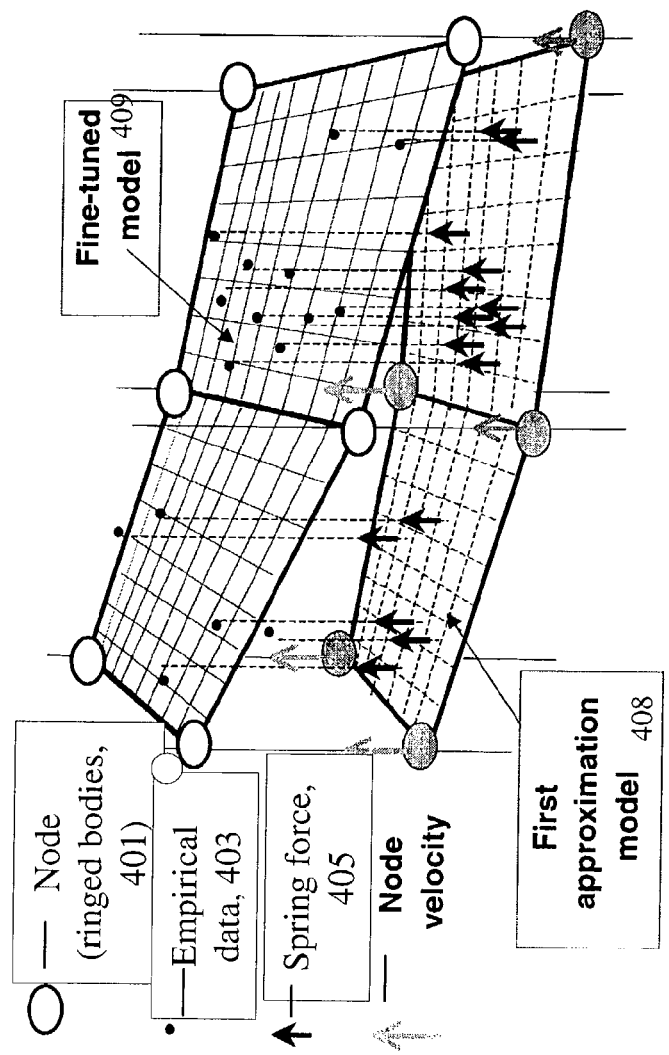
FIG. 4A is a diagram illustrating a two-dimensional virtual elastic mechanical system as contemplated by embodiments of the present invention.

The virtual mechanical system can be expanded to an n-dimensional system. For example, FIG. 4A illustrates a two-dimensional system. More specifically, FIG. 4A depicts interactions between a field of output values from empirical data points and its virtual mechanical representation when there are two input parameters. More specifically, FIG. 4A illustrates a two-dimensional mechanical system having surfaces instead of bars as described above in connection with FIG. 3. The surface is connected to the empirical data points by means of a system of springs that have the elasticity corresponding to the coefficient $W_i$ in the objective function. The elasticity can be influenced by many factors such as the distance $y_i^* - y_i^{predicted}$, or the "freshness" of the new empirical data point (as described above in connection with assigning values to the coefficient $W_i$).

Similar to the one-dimensional virtual system illustrated in FIG. 3, the two-dimensional virtual system also includes ring-shaped bodies (represented by oval shaped members 401) at various nodes, springs at empirical data points (represented by dots 403) and their corresponding spring forces (represented by arrows 405), and members capable of being attached to springs (surfaces stretched out between the ring-shaped bodies 401). Driven by the spring force, the surfaces (i.e., cells) start moving from a previous equilibrium position (designated as a first approximation model 408), and the surfaces start oscillating about their equilibrium position (designated as a fine-tuned model 409). In the presence of a virtual stabilizing force (e.g., friction), the oscillation of the surfaces dampens, and the surfaces approach their equilibrium positions.

Figure 4B:
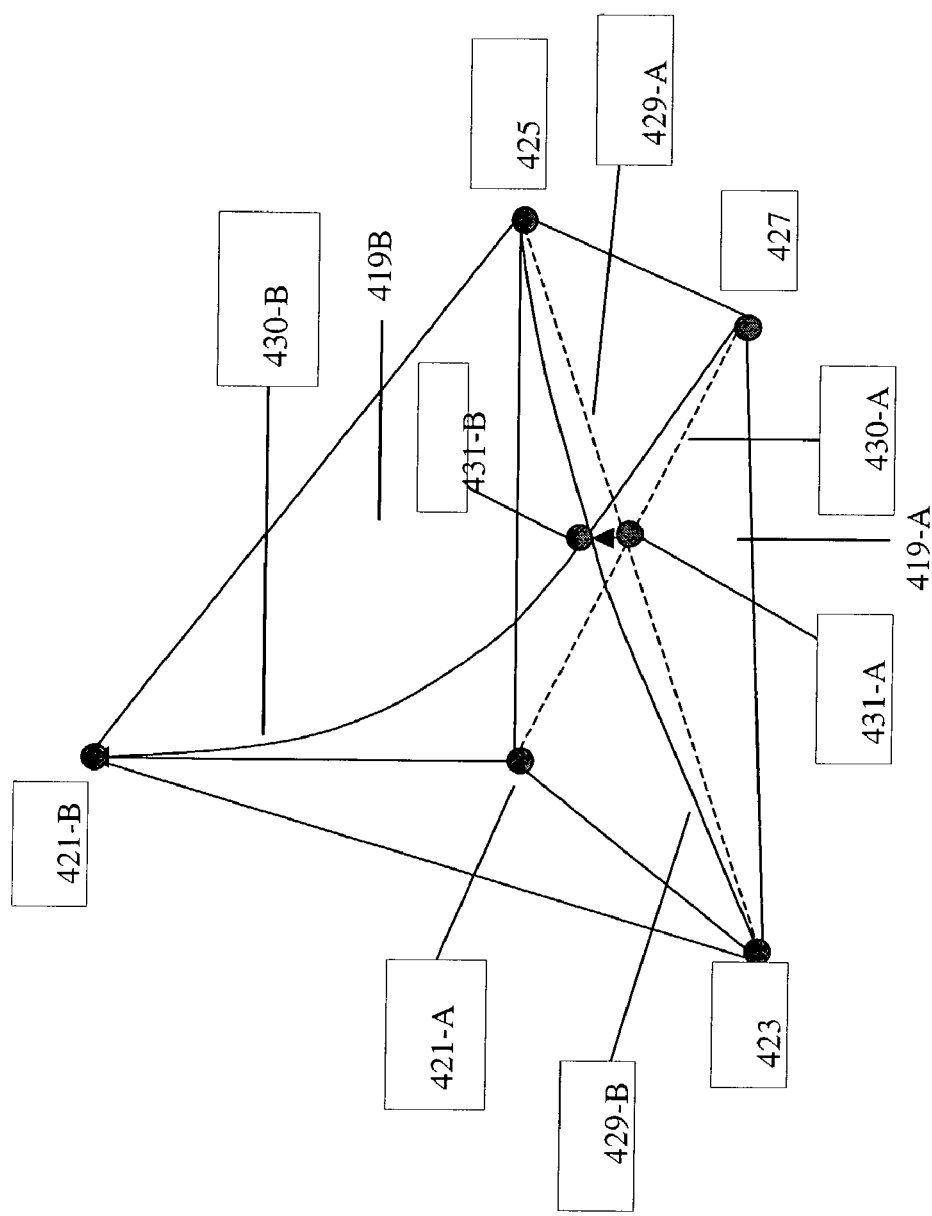
FIG. 4B is a diagram illustrating an example surface and its flexibility as used in the two-dimensional virtual elastic mechanical system as contemplated by embodiments of the present invention.

The shapes of one of the surfaces, as it moves from its first approximation model to its fine-tuned model, are shown as 419A and 419B of FIG. 4B. More specifically, the surface 419A, representing the first approximation model, is stretched between nodes 421A, 423, 425, and 427. Each of the nodes can move up or down on their corresponding rods. In addition, the surface 419A can also be stretched depending on locations of the nodes. For instance, when node 421A is moved to a new location 421B representing the first approximation model, the surface 419A can be stretched among the nodes 421B, 423, 425, and 427. In particular, an imaginary line 429A connects nodes 425 and 423 and another imaginary line 430A connects nodes 427 and 421A. These imaginary lines are on the surface 419A, and their intersection point is 431A. As the node 421A moves to the location 421B, a new surface 419B is formed. The new surface includes an imaginary line 429B connects nodes 427 and 421B and an imaginary line 430A connects nodes 425 and 423. A new intersection point of the imaginary lines 429B and 430B is 431B. The surface 419B can then shrink back and/or flatten when the node 421B moves back to its original location. It should be noted that the imaginary lines and their intersection points are described herein only to assist the understanding of embodiments of the present invention, they are not required in the analogized mechanical system.

The equilibrium positions reached by the virtual systems described above represent the minimization solution of the objective function, S. In other words, the task of finding the minimum of the objective function is reduced to the task of determining the dynamic process of the motion of a mechanical system to its equilibrium. Analogizing the minimization problem into the language of mechanics allows using mathematical understanding well established in the theoretical mechanics field. A specific advantage of the mechanical analogy method is the ability of the model to easily add newly obtained empirical data points by introducing new spring forces on the surface (or the bar in a one-dimensional case).

In at least some embodiments, new data (empirical data) points are being obtained in the course of the process. Therefore, the virtual system of embodiments of the present invention can be constantly updated according to the newly-obtained data points. It follows that embodiments of the present invention are adaptive to empirical data. When the surface (or the bar) is located in its equilibrium position, any desired output values can be mapped to one or more specific input parameter values. For instance, referring to FIG. 3, if Y's predicted value is desired, then X's would be the specific input parameter value to achieve the desired output value (assuming that the bar 317 reached its equilibrium position). The specific input parameter is used to control the manufacturing device that has been modeled as shown in FIG. 3. Once the model is obtained, the model can then be used in calculating values of input parameters (i.e., recipes) for any set of desired output characteristics.

Figure 5:
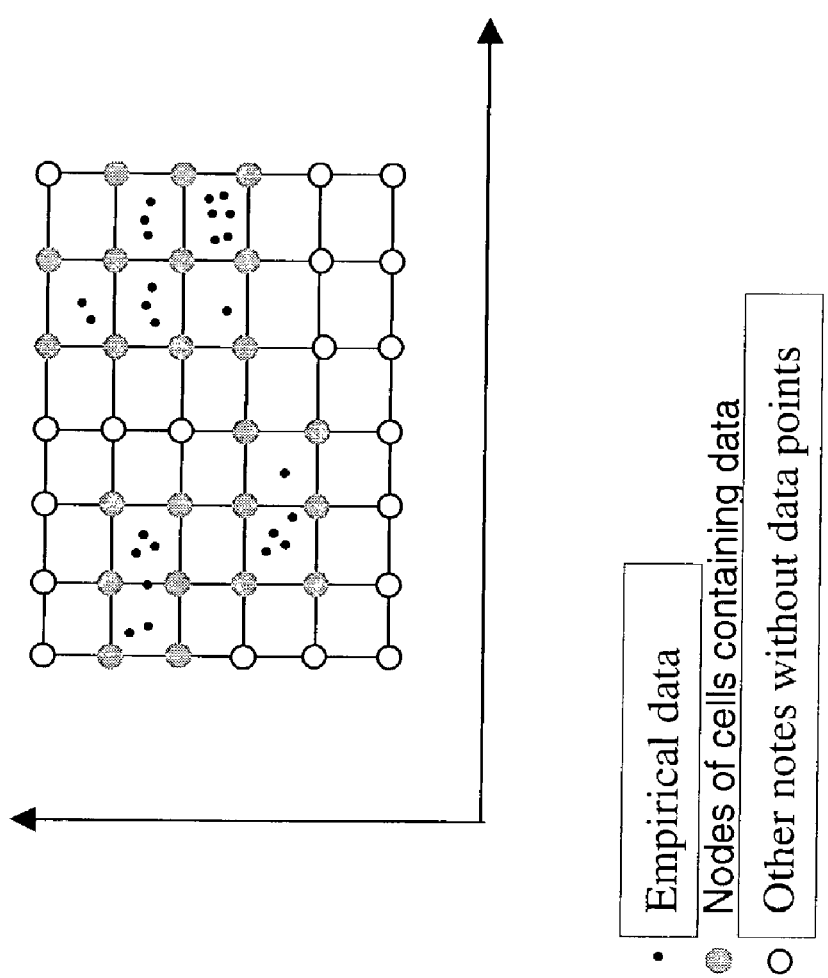
FIG. 5 is a diagram illustrating cells and nodes with and without empirical data points in various cells.

When there are numerous cells as shown in FIG. 5, some cells may not be populated with empirical data points, at least initially. In FIG. 5, which shows the top view of FIG. 4A with a rectangular grid of cells and nodes, black points represent empirical data points, gray circles represent local nodes of cells having empirical data points, and white circles represent local nodes of cells having no empirical data points. For the cells having empirical data points, predicted output values are calculated as described above. For the cells having no empirical data, weakly strained springs, can be fixed to the nodes (ringed-bodies) of those cells. Since empirical data points are represented in the virtual mechanical system as tightly strained springs, in the absence of such springs, the weak springs can "pull" the nodes of the cells without any empirical data in an effort to position them in parallel to each other within the general movement to the equilibrium of the surfaces (or the bars). The nodes arrive at certain positions, thereby providing the not yet existing output values to be incorporated into the equilibrium positions reached by the surfaces of the cells having empirical data points.

Figure 6:
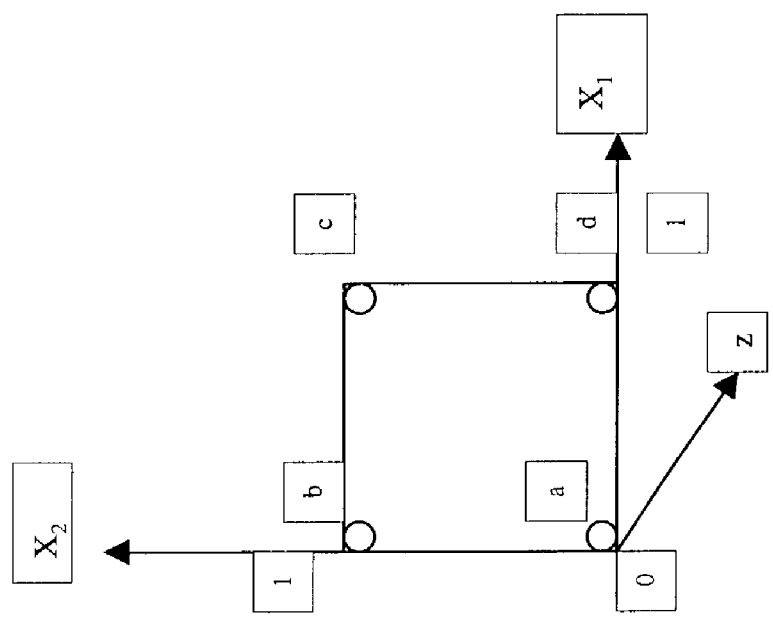
FIG. 6 is a diagram illustrating example single-cell embodiments of the present invention.

In order to illustrate the above described virtual systems with a practical example, FIG. 6 depicts a manufacturing process in which result Y (the output value) depends on two parameters $X_1$ and $X_2$, that vary within (0,1) range. Assume that the initial prediction function is, for example, $Y=3X_1+2X_2+2X_1X_2+1$. Suppose, further, that 19 empirical data points have obtained at various combinations of parameters $(X_1, X_2)$ as shown in Table 1 below. Also assume that one cell (having nodes designated as a, b, c and d) shown in FIG. 6 is the most reduced version of a grid in this example. In accordance with the ruled interpolation method:

$$Y_{predicted} = z_a(1-x_1)(1-x_2) + z_b(1-x_1)x_2 + z_c x_1 x_2 + z_d x_1(1-x_2)$$
Equation (2).

A set of $(z_a, z_b, z_c, z_d)$ values that yields the minimum value of the preceding equation is calculated. Assuming that all 19 empirical data points are to be of equal relevance, this assumption is reflected by assigning a same weight value of, for example, ½ to each of the 19 points. The resulting objective function is as follows:

$$\min_{z_a, z_b, z_c, z_d} \sum_{i=1}^{19} (y_{predicted,i} - y_{actual,i})^2$$

or $$\min_{z_a, z_b, z_c, z_d} \sum_{i=1}^{19} \left( z_a(1-x_{1i})(1-x_{1i}) + z_b(1-x_{2i})x_{2i} + z_c x_{1i} x_{2i} + z_d x_{1i}(1-x_{2i}) - y_{actual,i} \right)^2$$

where $x_{1i}, x_{2i}$ and $y_{actual}$ are taken from Table 1.

Table 1

Data obtained within 19 process runs.

| X1 | x2 | actual output y |
|---|---|---|
| 0.679897 | 0.696107 | 5.37003 |
| 0.731158 | 0.915073 | 6.181706 |
| 0.380563 | 0.724945 | 4.340078 |
| 0.755124 | 0.28081 | 4.024312 |
| 0.465136 | 0.310184 | 3.31687 |
| 0.026719 | 0.615412 | 2.181216 |
| 0.930855 | 0.133567 | 4.543877 |
| 0.743958 | 0.623399 | 5.461695 |
| 0.016681 | 0.034814 | 0.93027 |
| 0.578064 | 0.378034 | 4.118314 |
| 0.298074 | 0.599904 | 3.635168 |
| 0.113188 | 0.82833 | 3.055715 |
| 0.095643 | 0.523683 | 2.335719 |
| 0.051782 | 0.760421 | 2.657595 |
| 0.675022 | 0.601997 | 5.003285 |
| 0.549892 | 0.698493 | 4.618429 |
| 0.580469 | 0.995485 | 6.074115 |
| 0.952159 | 0.367101 | 5.293921 |
| 0.513004 | 0.42478 | 4.063278 |

The above described equation is now analogized to a virtual mechanical system whose potential energy is described by S. The equation S also allows the forces exerted by 19 springs to be derived. First, (a, b, c, d) are designated as ring-shaped bodies whose mass value is m. These bodies can freely move along z axis, this axis being perpendicular to the surface designated by $x_1, x_2$. The coordinates of these bodies are designated as $z_a, z_b, z_c, z_d$. Further assuming that (a, b, c d) are interconnected by a surface described by equation (2), this surface is linked to points whose coordinates are $x_1=x_{1i}, x_2=x_{2i}, z=y_{actual\,i}$ (i=1, ..., 19). This linkage is performed by adjusting springs between the points and the surface as described above in connection with FIGS. 3, 4A, 4B. Each spring can have stiffness, C, equal to 1.

In accordance with the laws of mechanics that the above-mentioned mechanical system obeys, the bodies (a, b, c, d) are subject to mechanical forces described as follows:

$$\begin{cases} f_a = -\frac{\partial S}{\partial z_a} = \sum_{i=1}^{19} A_i(1-x_{1i})(1-x_{2i}) \\ f_b = -\frac{\partial S}{\partial z_b} = \sum_{i=1}^{19} A_i(1-x_{1i})x_{2i} \\ f_c = -\frac{\partial S}{\partial z_c} = \sum_{i=1}^{19} A_i x_{1i} x_{2i} \\ f_d = -\frac{\partial S}{\partial z_d} = \sum_{i=1}^{19} A_i x_{1i}(1-x_{2i}) \end{cases}$$
Equation (3)

where $$A_i = [z_a(1-x_{1i})(1-x_{2i}) + z_b(1-x_{1i})x_{2i} + z_c x_{1i} x_{2i} + z_d x_{1i}(1-x_{2i})]$$

Assume further that the bodies a, b, c, d, are placed within a viscous liquid in order to introduce friction to dampen oscillation, whose viscosity level designated as μ. Hence, in accordance with the laws of mechanics, the movements of bodies (a, b, c, d) are described by the following system of differential equations:

$$\begin{cases} m\frac{d^2 z_a}{d\tau^2} = f_a - \mu\frac{dz_a}{d\tau} \\ m\frac{d^2 z_b}{d\tau^2} = f_b - \mu\frac{dz_b}{d\tau} \\ m\frac{d^2 z_c}{d\tau^2} = f_c - \mu\frac{dz_c}{d\tau} \\ m\frac{d^2 z_d}{d\tau^2} = f_d - \mu\frac{dz_d}{d\tau} \end{cases}$$
Equation (4)

where τ is a virtual time value.

Having solved this system of equations, the movements of bodies (a, b, c, d) along z axis strive to obtain the equilibrium position, or the solution to minimize the objective function, S. It should be noted that, according to the laws of mechanics, the state of equilibrium does not depend on mass m and viscosity μ.

Figure 7:
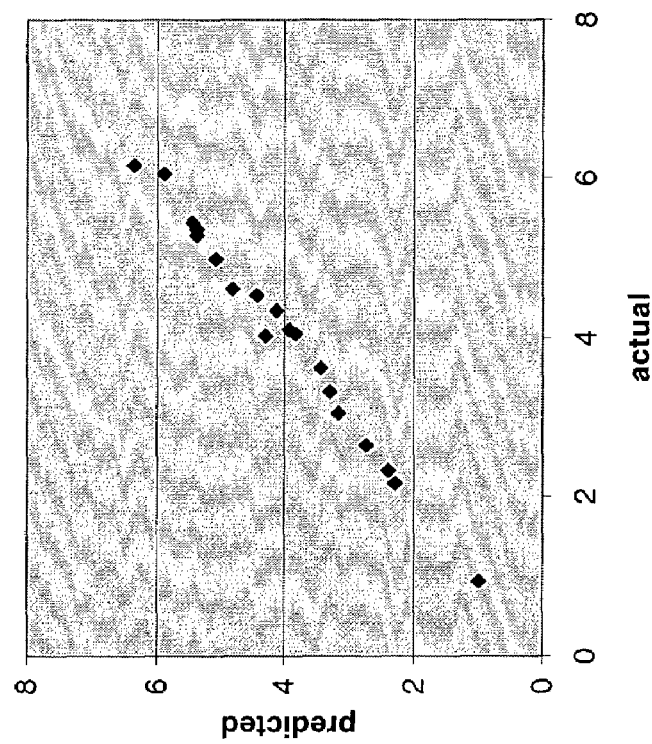
FIG. 7 is a graph illustrating a set of actual output values and a set of predicted output values in example embodiments of the present invention.

Table 2 represents a solution for the equation (4), namely, the output values at the grid nodes. FIG. 7 illustrates the level of precision at which the above described technique predicts the process. As illustrated, the locus of points in FIG. 7 forms a 45° shape indicating that the predicted output values were close to output values of empirical data points.

TABLE 2

Node values providing S minimum

| Value | Node's coordinates | | Node |
|---|---|---|---|
| 0.84151 | 0 | 0 | a |
| 4.1768 | 1 | 0 | d |
| 3.0042 | 0 | 1 | b |
| 7.9746 | 1 | 1 | c |

Yet another example of using a virtual mechanical system is described herein for a Chemical-Mechanical-Planarization (CMP) process, which is a way to polish a wafer in microelectronic manufacturing processes. In a CMP process, a wafer is fixed to a rotating head that presses the wafer to a pad surface at variable levels of pressure. The pressure is distributed along the pad radius according to a prescribed scheme (also referred to as a pressure profile or a profile). The polishing is performed with the application of a certain type of slurry, which is a mixture of a fine abrasive and active chemical agent. In particular, a wafer is coated with a thin (~10000 Å) layer of a certain substance. The thickness of the layer is not evenly flat over the wafer. The task of wafer polishing is to remove part of the layer thickness in order to obtain a prescribed thickness value (a target value), for example, 4000 Å.

The thickness of the layer is measured in different regions of the wafer before it enters a polishing tool. The overall wafer surface can be subdivided into smaller concentric regions, for example, 7 regions. It is assumed that within a region, the layer thickness is evenly distributed. Therefore, each wafer entering a polishing tool is characterized by 7 thick-in (thickness at input) values (Thickin1, Thickin2, . . . , Thickin7). Hence, for each wafer there are 7 Removal-Target Values: $R_i$=Thickin$_i$–Targetvalue$_i$, where i=1, . . . ,7, in accordance with the 7 wafer regions. It should be noted that setting the number of regions as 7 is an arbitrary example. Any other number of regions can be used within embodiments of the present invention.

As different distributions of pressure are applied to the pad, different patterns (e.g., profiles) can result. In order to simplify the description, assume that there are only a finite number of profiles, for example, 5. In this example, three out of 5 profiles may not vary, while the remaining two can be altered by applying additional pressure. The values of these additional pressures can be designate as $P_1$ and $P_2$. Different profiles provide different distribution of a removal rate (rotation speed) along the radius. This enables a controller for the CMP tool to select for each wafer a set of polishing duration values $t_1, t_2, \ldots, t_5$ (in accordance with the 5 abovementioned profiles) that is predicted to achieve the prescribed set of Removal targets $R_i$ for each of the seven regions.

The above described scenario can be represented by a mathematical equation as follows:

$Y_i = f_i(t_1, t_2, \ldots, t_5, P_1, P_2, m_1, m_2)$, where i=1, . . . ,7, $y_i$ is predicted values of removals, $m_1$ is Pad life value of $m_1$ and $m_2$ is Disk life value. The Pad life and Disk life are the ages of pad and disc units, respectively, after being replaced (they are periodically replaced). The removal rate depends, among other things, on $m_1$ and $m_2$. The best result can be achieved by minimizing the following equation:

$$S = \sum_{i=1}^{7} (f_i(t_1, \ldots, t_5, P_1, P_2, m_1, m_2.) - R_i)^2$$

Figure 8:
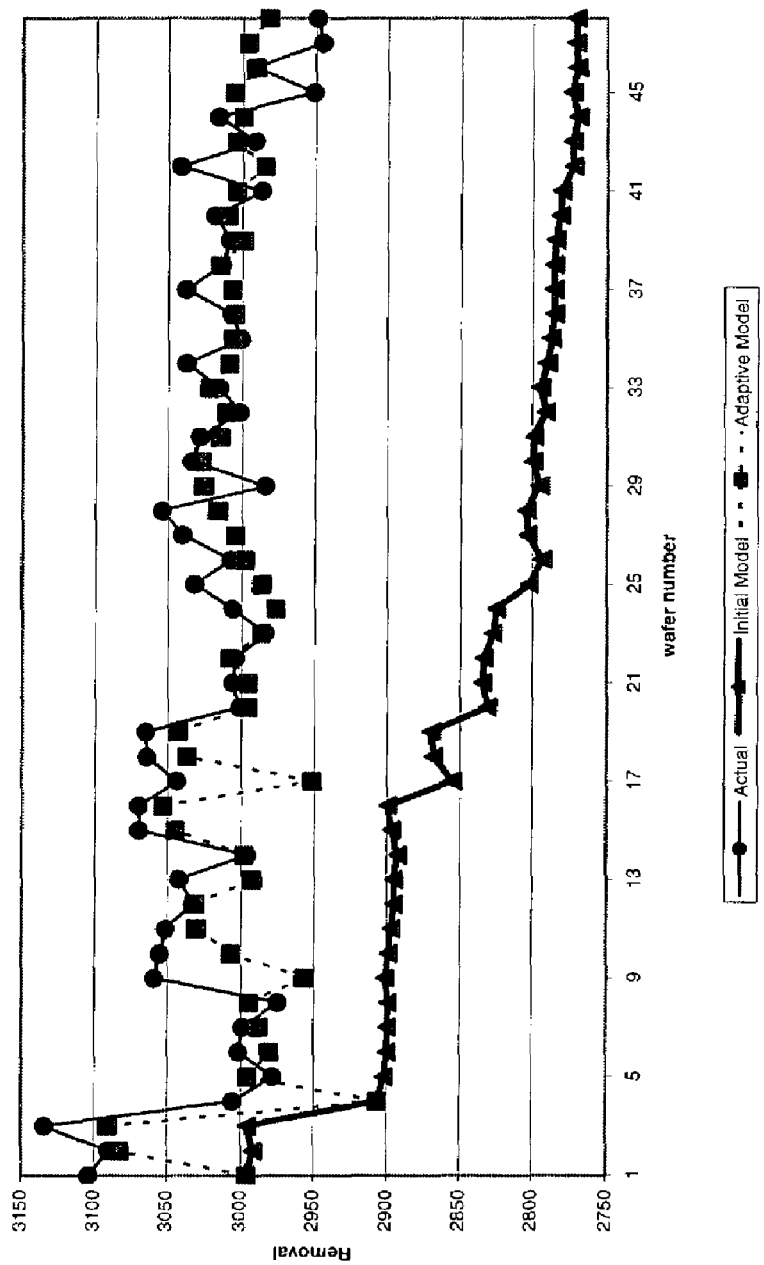
FIG. 8 is a graph illustrating improved results of an industrial process that uses embodiments of the present invention.
Figures 9A, 9B:
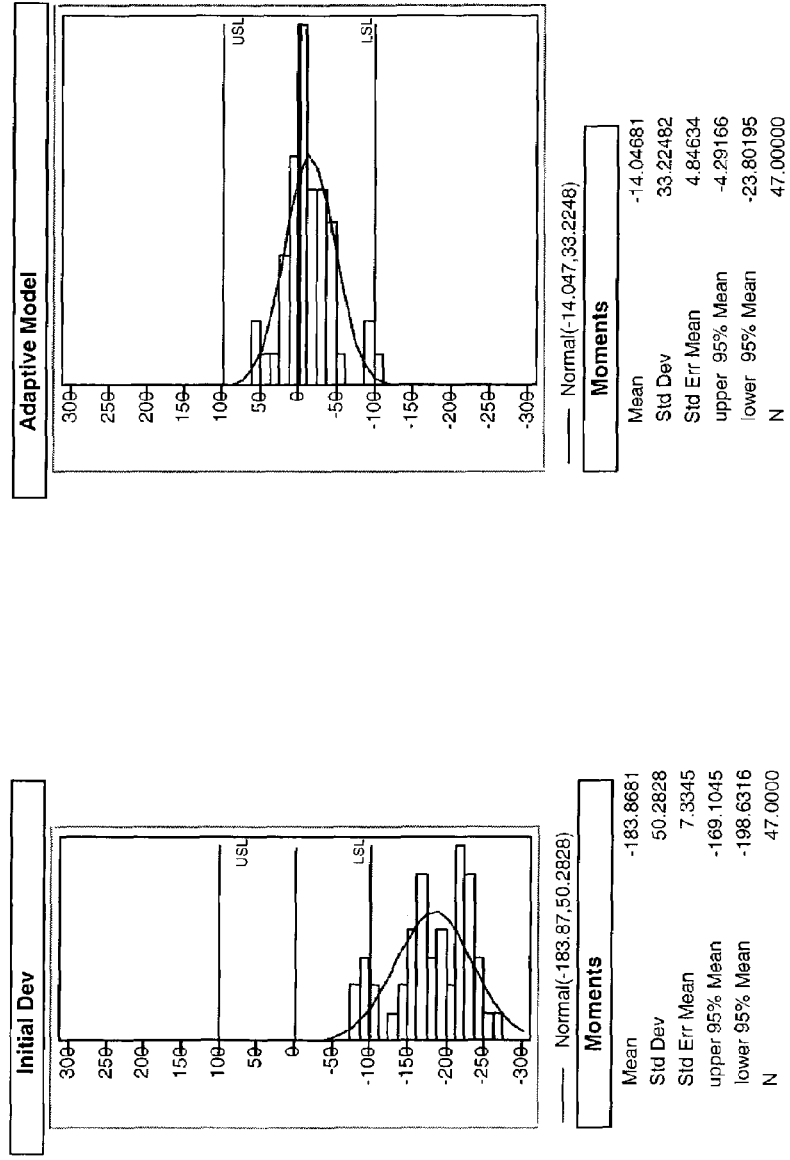
FIGS. 9A-B are graphs illustrating curves depicting distributions before and after using embodiments of the present invention.

Initially, a conventional predictive model is used. This initial model is obtained as a result of a limited number of preliminary experiments based on a conventional method. This preliminary model is based on a limited amount of data and therefore is expected to be non-precise. The results of the two different control processes have been collected. The collected data are illustrated in FIGS. 8 and 9A-B. In particular, FIG. 8 shows actual removal values, predicted removal values estimated using the initial model and predicted removal values estimated using embodiments of the present invention (i.e., the "adaptive model"). It is apparent that the predicted removal values estimated using embodiments of the present invention closely resembles the actual removal values. FIGS. 9A-B show statistical distribution of predicted removal values estimated by the initial model and estimated by the embodiments of the present invention, respectively when they are compared with the actual removal values.

Although the description to this point has been directed to one example objective function (i.e., Equation 1), there are any number of other objective functions contemplated within embodiments of the present invention. For instance, another example objective function is:

$$\min_{z_k \forall k} \left[ \sum_{i=1}^{N_{data}} W_i(y_i - y_i^{predicted})^2 + \sum_{k=0}^{N_{nodes}} W_k(z_k - z_k^*)^2 \right]$$

$$s.t. \quad z_{k,max} \geq z_k \geq z_{k,min}, \forall k$$

$$\Delta y_{j,max}^{predicted} \geq \frac{\partial y}{\partial x_j} \geq \Delta y_{j,min}^{predicted}, \forall j$$

$W_i$—coefficients which weight the importance of one data point versus another,
$W_k$—coefficients which weight allowable deviations from the previous model to a new model,
$y_i$—the $i^{th}$ observed output value,
$y_i^{predicted}$—the prediction of the $i^{th}$ observed output value based on the ruled interpolation, formula using all model inputs corresponding to the $i^{th}$ observed output value, $$y_i^{predicted} = f(z_1, z_2, \ldots, z_m, x_1, x_2, \ldots, x_n) + z_o,$$

$x_j$—a model input from a set which consists of measurements, recipe parameters, or any other value which may be used to facilitate a prediction,
$z_k$—an output value at node k,
$z_o$—a bias term for $z_k$,
$z^*_k$—an output value at node k of a previous model,
$z_{k,max}, z_{k,min}$—maximum and minimum, respectively, for the value of nodes which are updated in the model of embodiments of the present invention,
$\Delta y_{j,max}, \Delta y_{j,min}$—maximum and minimum, respectively, for the change in predicted output values with respect to changes in $x_j$,
i—an index for an empirical data point, and
k—an index for a node.

In the above described objective function, the sensitivities of models to noise can be reduced by adjusting the values of various parameters. For instance, coefficients (e.g., $W_k$) that weight the importance of one data point versus another can be adjusted to ensure the models do not react to noise (especially when there are only a limited number of data points). In another example, a bias component (e.g., $z_o$) can be used to prevent initial oscillations.

The above-described objective function also allows weight to be given to the nodes in a relative manner. This allows the identification of the model to "prefer" changes in nodes in one specific direction versus another. For instance, by setting $W_n$ to have a higher value than $W_m$, the value of node N would readily adapt to new data points compared with the value of node M. In another aspect of the above-described objective function, node constraints can be applied such that the values of the nodes (or the derivate of the output with respect to specific model inputs) will be within specific values (e.g., "s.t.", which defines the values to minimize subject to a set of limits or constraints). When an optimal model is identified, a threshold is used to prevent a single data point from unduly influencing the optimization process.

With respect to the use of new data points in calculating a new model, the criteria for keeping the new data within the pool of data points to optimize the objective function can be: the size of the pool, comparison of uniqueness of datum (with respect to measurements and recipe) versus other candidate data, and/or age (time period data was obtained). When a trigger event (a predefined event which is able to be observed via a measurement or some other means) occurs, the pool of data points is emptied and a weighting is used as the bias term versus changes in the node values. This allows fast reaction with little information while preserving the structure of the model. Examples of the triggered event could be a sudden, large prediction error or a PM (preventative maintenance) performed on a semiconductor manufacturing equipment process tool.

Now turning to describe determining an optimized recipe based on the optimized models, the optimized recipe can be obtained by solving another objective function, an example of which is:

$$\min_{u_r \forall r} \left[ \sum_{l=1}^{N_{CO}} W_l (y_l^{desired} - y_l^{predicted})^2 + \sum_{r=0}^{N_{MV}} (W_r(u_r - u_r^*)^2) \right]$$

$$s.t. \quad y_{l,max} \geq y_l^{predicted} \geq y_{l,min}, \forall l$$
$$\Delta u_{r,max} \geq \Delta u_r \geq \Delta u_{r,min}, \forall r$$
$$u_{r,max} \geq u_r \geq u_{r,min}, \forall r$$

$W_l$—coefficients which weight the importance of one controlled output versus another,
$W_r$—coefficients which weight allowable deviations from the previous value of a manipulated variable to a new value of a manipulated variable,
$y_i^{desired}$—the desired value of the $l^{th}$ controlled output,
$y_i^{predicted}$—the prediction of the $l^{th}$ controlled output value based on the ruled interpolation formula using all previously determined node values and model inputs which are either calculated or collected, $$y_i^{predicted} = f(z_1, z_2, \ldots, z_m, u_1, u_2, \ldots, u_n) + z_o,$$

$u_r$—a model input from a set which consists of measurements, manipulated variables, or any other value which may be used to facilitate a prediction, $z_k$—an output value at node k, where $z_o$ corresponds to a bias term,
$y_{l,max}$, $y_{l,min}$—mmaximum and minimum, respectively, for the value of predictions which are updated in the model,
$\Delta u_{r,max}$, $\Delta u_{r,min}$—maximum and minimum, respectively, for the change of manipulated variable values with respect to previous values, and
$u_{r,max}$, $u_{r,min}$—maximum and minimum, respectively, for manipulated variable values.

The above-described equation can be solved by using standard optimization methods to determine a recipe. Alternatively, the equation can be solved by an incomplete search method to minimize the difference between previous predictions and model predictions. In the above described objective function, noise sensitivity can also be reduced by adjusting the values of various parameters. For instance, an initial minimum change weight for changes (e.g., for $W_r$) in recipe parameters can be provided to prevent oscillations.

Once the solution, $f(z_1, z_2, \ldots, z_m, u_1, u_2, \ldots, u_n)+z_o$, is obtained (representing the predictive model), it is then used in deriving values of input parameters for any given set of desired output characteristics.

Although the above-described embodiments show only one output value for an input domain, embodiments of the present invention can also be configured to handle more than one output values for any given input domain. For example, a second domain would include its own set of ring-shaped bodies, rods and bars, which may operate independent from the first set of ring-shaped bodies, rods and bars as shown in FIG. 3. It should be noted that the above described one or more of the example embodiments can be part of PRO-FILER®, manufactured by Applied Materials, Inc. of Santa Clara, Calif.

It should be understood that the various functions, industries, mechanisms, etc. mentioned in the examples above are merely by way of illustration, and that embodiments of the present invention contemplate use in any number of other types and variations of applications.

Figure 10:
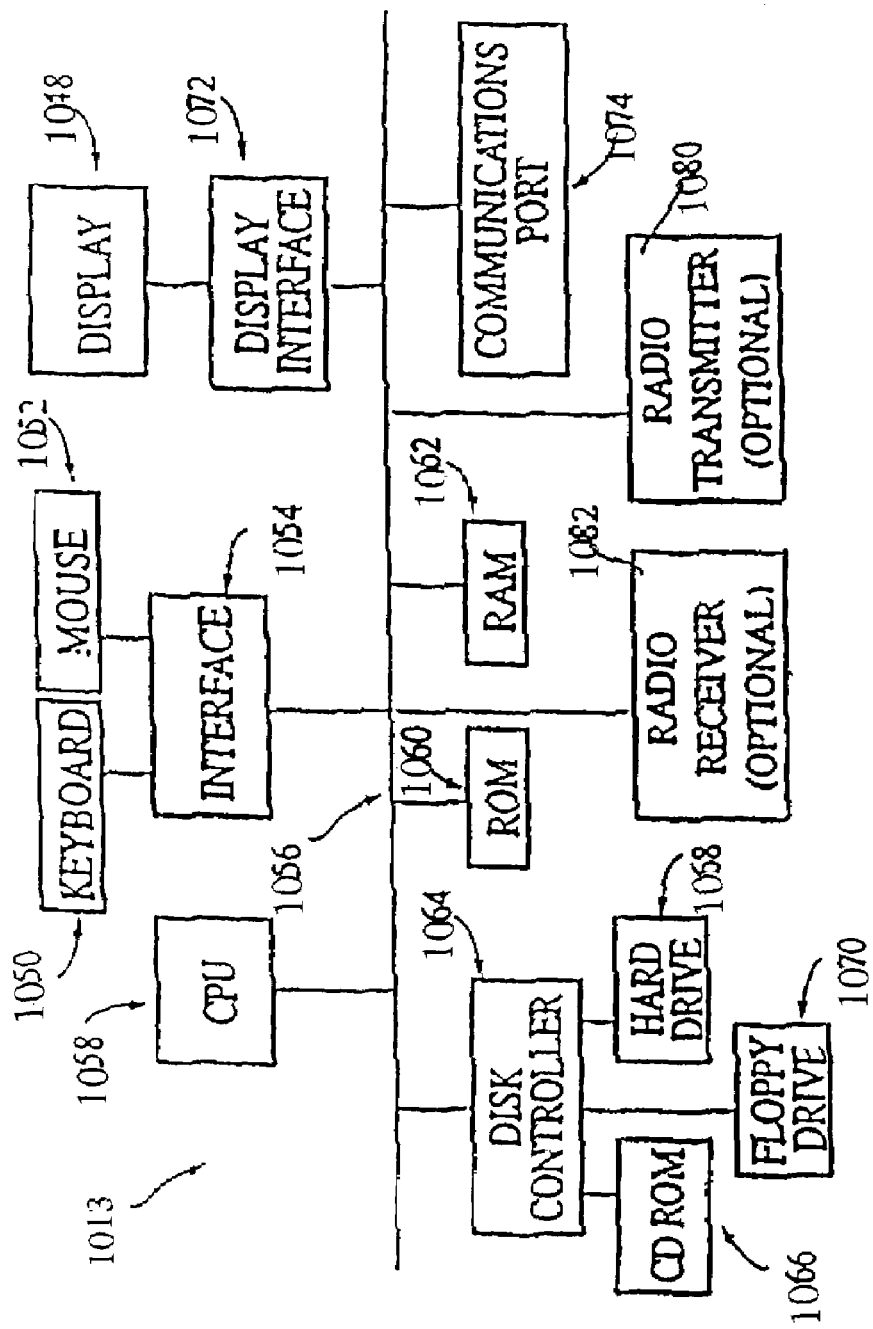
FIG. 10 is a block diagram representation of example embodiments of a computer configured to perform embodiments of the present invention.

An example embodiment of the computer in which at least some embodiments of the present invention operates is described below in connection with FIGS. 10-11. FIG. 10 illustrates a block diagram of one example of the internal hardware 1013 of a computer configured to perform embodiments of the present invention. A bus 1056 serves as the main information highway interconnecting various components therein. CPU 1058 is the central processing unit of the internal hardware 1013, performing calculations and logic operations required to execute embodiments of the present invention as well as other programs. Read only memory (ROM) 1060 and random access memory (RAM) 1062 constitute the main memory.

Disk controller 1064 interfaces one or more disk drives to the system bus 1056. These disk drives are, for example, floppy disk drives 1070, or CD ROM or DVD (digital video disks) drives 1066, or internal or external hard drives 1068. These various disk drives and disk controllers are optional devices.

A display interface 1072 interfaces display 1048 and permits information from the bus 1056 to be displayed on display 1048. Communications with external devices, such as the other components of the system described above, occur utilizing, for example, communication port 1074. Optical fibers and/or electrical cables and/or conductors and/or optical communication (e.g., infrared, and the like) and/or wireless communication (e.g., radio frequency (RF), and the like) can be used as the transport medium between the external devices and communication port 1074. Peripheral interface 1054 interfaces the keyboard 1050 and mouse 1052, permitting input data to be transmitted to bus 1056. In addition to these components, the internal hardware 1013 also optionally includes an infrared transmitter and/or infrared receiver. Infrared transmitters are optionally utilized when the computer system is used in conjunction with one or more of the processing components/stations/modules that transmit/receive data via infrared signal transmission. Instead of utilizing an infrared transmitter or infrared receiver, the computer system may also optionally use a low power radio transmitter 1080 and/or a low power radio receiver 1082. The low power radio transmitter transmits the signal for reception by components of the production process, and receives signals from the components via the low power radio receiver. The low power radio transmitter and/or receiver are standard devices in industry.

Figure 11:
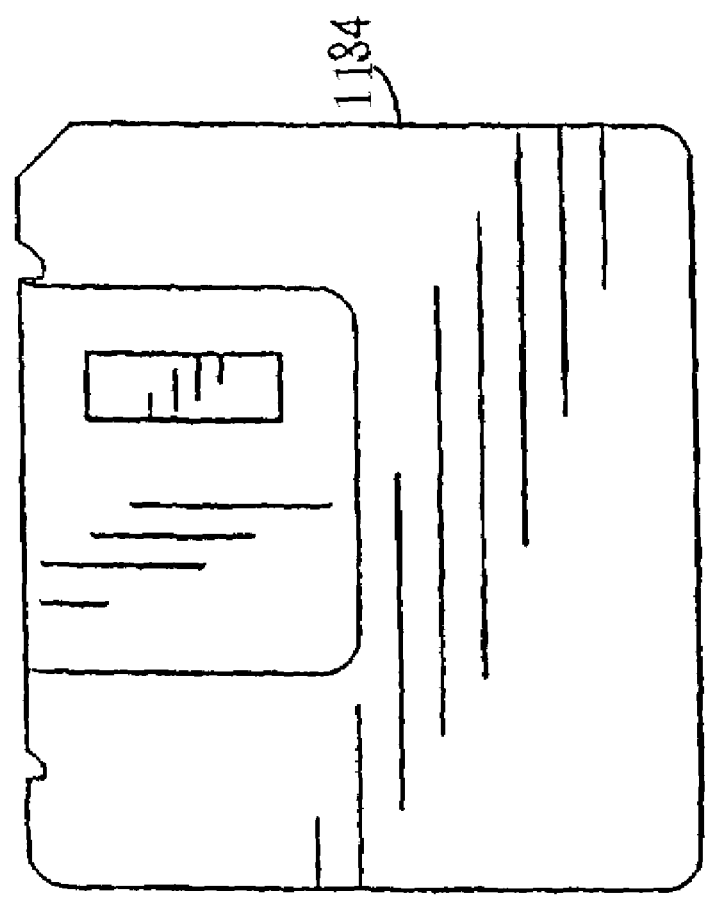
FIG. 11 is a diagram illustrating an example of a memory medium which may be used for storing computer programs of embodiments of the present invention.

Although the computer in FIG. 11 is illustrated having a single processor, a single hard disk drive and a single local memory, the analyzer is optionally suitably equipped with any multitude or combination of processors or storage devices. For example, the computer may be replaced by, or combined with, any suitable processing system operative in accordance with the principles of embodiments of the present invention, including sophisticated calculators, and hand-held, laptop/notebook, mini, mainframe and super computers, as well as processing system network combinations of the same.

FIG. 11 is an illustration of an example computer readable memory medium 1184 utilizable for storing computer readable code or instructions. As one example, medium 1184 may be used with disk drives illustrated in FIG. 10. Typically, memory media such as a CD ROM, a digital video disk or a floppy disk will contain, for example, a multi-byte locale for a single byte language and the program information for controlling the modeler to enable the computer to perform the functions described herein. Alternatively, ROM 1060 and/or RAM 1062 illustrated in FIG. 10 can also be used to store the program information that is used to instruct the central processing unit 1058 to perform the operations associated with various automated processes of the present invention. Other examples of suitable computer readable media for storing information include magnetic, electronic, or optical (including holographic) storage, some combination thereof, etc.

In general, it should be emphasized that the various components of embodiments of the present invention can be implemented in hardware, software or a combination thereof. In such embodiments, the various components and steps would be implemented in hardware and/or software to perform the functions of embodiments of the present invention. Any presently available or future developed computer software language and/or hardware components can be employed in such embodiments of the present invention. For example, at least some of the functionality mentioned above could be implemented using Visual Basic, C, C++, or any assembly language appropriate in view of the processor(s) being used. It could also be written in an interpretive environment such as Java and transported to multiple destinations to various users.

The many features and advantages of embodiments of the present invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer implemented method for generating parameters for a manufacturing apparatus to produce wafers, the method comprising:
identifying one or more input parameters that cause a change in output characteristics of the wafers produced by the manufacturing apparatus;
defining at least one cell having one or more extreme values defined by one or more values of the input parameters, wherein the one or more extreme values are characterized by first nodes;
estimating output values at the one or more extreme values, wherein an output value numerically represents the output characteristics;
assigning at least one first mathematical function to each at least one cell, the at least one first mathematical function based on the estimated output values at the one or more extreme values configured to predict an output value for a set of values of the input parameters within the assigned at least one cell;
receiving at least one empirical data point having empirical values for the input parameters and an empirical output value;
adjusting the estimated output values at the one or more extreme values based on the empirical output value and a predicted output value calculated using the assigned at least one first mathematical function based on the empirical values for the input parameters, allowing a numerical value for the output characteristics to be calculated using the at least one first mathematical function based on the adjusted estimated output value at the one or more extreme values;
generating a second mathematical function, wherein the second mathematical function is based on a difference between the empirical output value for the output characteristics and the predicted output value calculated using the assigned mathematical function based on the adjusted estimated output values of the first nodes;
solving the second mathematical function as potential energy of a virtual multidimensional mechanical system to generate optimized output values; and
generating a recipe for controlling the manufacturing apparatus to produce the wafers using the optimized output values.

2. The method of claim 1, wherein defining at least one cell further comprises:
dividing an input domain into a plurality of cells;
defining one of the plurality of cells as the at least one cell; and
dividing the input domain into a plurality of cells having second nodes, wherein the second nodes characterize an estimated maximum and an estimated minimum of the input parameters,
wherein for the at least one cell all of the second nodes become first nodes.

3. The method of claim 1, wherein defining at least one cell further comprises:
defining a maximum value and a minimum value of the input parameters with respect to the at least one cell; and
defining the maximum and minimum values to be the one or more values of the input parameters.

4. The method of claim 1, wherein one of the output characteristics is a thickness of a region of a layer on a wafer polished by a CMP process.

5. The method of claim 1, wherein the at least one first mathematical function is a ruled interpolation equation.

6. The method of claim 1, wherein the second mathematical function is:

$$S = \sum_{i,\forall i} W_i \left(y_i^* - y_i^{predicted}\right)^2$$

with $$\min_{z_k \forall k} S,$$

where $$y_i^{predicted} = \sum_{(by.all.nodes)} \alpha_{ik} z_k,$$

$W_i$—a weight coefficient,
$y_i^*$—an empirical output value at an empirical data point i,
$y_i^{predicted}$—an output value calculated by the mathematical equation,
$z_k$—an output value at node k,
$\alpha_{ik}$—a coefficient that depend solely on the location of point i and node k,
i—an index for an empirical data point, and
k—an index for a node.

7. The method of claim 6, further comprising:
adjusting a value assigned to the coefficient, $W_i$, based on a precision requirement or when a particular empirical data point is received compared with other empirical data points.

8. The method of claim 1, wherein solving the second mathematical function comprises:
representing the first and second nodes as free moving bodies each of which is configured to move along a guide, wherein the guide is a fixed unmovable body disposed orthogonally to an input parameter space in which input parameter values are located;
providing a representation of at least one member capable of being attached to springs, the member fixed between two of the free moving bodies;
representing the empirical data points as fixed points in the virtual mechanical system; and
connecting a representation of a spring between at least one of the fixed points and the at least one member to force the member to reach an equilibrium position.

9. The method of claim 8, further comprising:
representing the free moving bodies as ring-shaped bodies;
representing the fixed unmovable bodies as rods on which the free moving bodies are guided; and
representing the at least one member as a bar tied to the free moving bodies and configured to move in association with movements of the ring-shaped bodies.

10. The method of claim 8, further comprising:
representing the free moving bodies as ring-shaped bodies;
representing the fixed unmovable bodies as rods on which the free moving bodies are guided; and
representing the at least one member as a surface, corners of which are tied to the free moving bodies and configured to move in association with movements of the ring-shaped bodies.

11. A computer-assisted system configured to generate parameters for a manufacturing apparatus to produce wafers, comprising:
means for identifying one or more input parameters that cause a change in output characteristics of the wafers produced by the manufacturing apparatus;
means for defining at least one cell having one or more extreme values defined by one or more values of the input parameters, wherein the one or more extreme values are characterized by first nodes;
means for estimating output values at the one or more extreme values, wherein an output value numerically represents the output characteristics;
means for assigning at least one first mathematical function to each at least one cell, the at least one first mathematical function based on the estimated output values at the one or more extreme values configured to predict an output value for a set of values of the input parameters within the assigned at least one cell;
means for receiving at least one empirical data point having empirical values for the input parameters and an empirical value of the output characteristics;
means for adjusting the estimated output values at the one or more extreme values based on the empirical value of the output characteristics and a predicted output value calculated using the assigned at least one first mathematical function based on the empirical values for the input parameters, allowing a numerical value for the output characteristics be calculated using the at least one first mathematical function based on the adjusted estimated output value at the one or more extreme values;
means for generating a second mathematical function, wherein the second mathematical function is based on a difference between the empirical output value for the output characteristics and the predicted output value calculated using the assigned mathematical function based on the adjusted estimated output values of the first nodes;
means for solving the second mathematical function as potential energy of a virtual multidimensional mechanical system to generate optimized output values; and
means for generating a recipe for controlling the manufacturing apparatus for producing the wafers using the optimized output values.

12. The system of claim 11, wherein the means for defining at least one cell further comprises:
means for dividing an input domain into a plurality of cells;
means for defining one of the plurality of cells as the at least one cell; and
means for dividing the input domain into a plurality of cells having second nodes, wherein the second nodes characterize an estimated maximum and an estimated minimum of the input parameters
wherein for the at least one cell all of the second nodes become first nodes.

13. The system of claim 11, wherein the means for defining at least one cell further comprises:
means for defining a maximum value and a minimum value of the input parameters with respect to the at least one cell; and
means for defining the maximum and minimum values to be the one or more values of the input parameters.

14. The system of claim 11, wherein one of the output characteristics is a thickness of a region of a layer on a wafer polished by a CMP process.

15. The system of claim 11, wherein the at least one first mathematical function is a ruled interpolation equation.

16. The system of claim 11, wherein the second mathematical function is:

$$S = \sum_{i,\forall i} W_i \left(y_i^* - y_i^{predicted}\right)^2$$

-continued with $$\min_{z_k \forall k}^s,$$

where $$y_i^{predicted} = \sum_{(by\_all\_nodes)} \alpha_{ik} z_k,$$

$W_i$—a weight coefficient,
$y_i^{*}$— an empirical output value at an empirical data point i,
$y_i^{predicted}$—an output value calculated by the mathematical equation,
$z_k$—an output value at node k,
$\alpha_{ik}$—a coefficient that depend solely on the location of point i and node k,
i—an index for an empirical data point, and
k—an index for a node.

17. The system of claim 16 further comprising:
means for adjusting a value assigned to the coefficient, $W_i$, based on a precision requirement or when a particular empirical data point is received compared with other empirical data point.

18. The system of claim 11, wherein means for solving the second mathematical function comprises:
means for representing the first and second nodes as free moving bodies each of which is configured to move along a guide, wherein the guide is a fixed unmovable body disposed orthogonally to an input parameter space in which input parameter values are located;
means for providing a representation of at least one member capable of being attached to springs, the member fixed between two of the free moving bodies;
means for representing the empirical data points as fixed points in the virtual mechanical system; and
means for connecting a representation of a spring between at least one of the fixed points and the at least one member to force the member to reach an equilibrium position.

19. The system of claim 18 further comprising:
means for representing the free moving bodies as ring-shaped bodies;
means for representing the fixed unmovable bodies as rods on which the free moving bodies are guided; and
means for representing the at least one member as a bar tied to the free moving bodies and configured to move in association with movements of the ring-shaped bodies.

20. The system of claim 18 further comprising:
means for representing the free moving bodies as ring-shaped bodies;
means for representing the fixed unmovable bodies as rods on which the free moving bodies are guided; and
means for representing the at least one member as a surface, corners of which are tied to the free moving bodies and configured to move in association with movements of the ring-shaped bodies.

21. A tangible computer readable medium that provides instructions, which when executed by one or more computers, causes the one or more computers to perform a method to generate parameters for a manufacturing apparatus to produce wafers, the method comprising:
identifying one or more input parameters that cause a change in output characteristics of the wafers produced by the manufacturing apparatus;
defining at least one cell having one or more extreme values defined by one or more values of the input parameters, wherein the one or more extreme values are characterized by first nodes;
estimating output values at the one or more extreme values, wherein an output value numerically represents the output characteristics;
assigning at least one first mathematical function to each at least one cell, the at least one first mathematical function based on the estimated output values at the one or more extreme values configured to predict an output value for a set of values of the input parameters within the assigned at least one cell;
receiving at least one empirical data point having empirical values for the input parameters and an empirical value of the output characteristics;
adjusting the estimated output values at the one or more extreme values based on the empirical value of the output characteristics and a predicted output value calculated using the assigned at least one first mathematical function based on the empirical values for the input parameters, allowing a numerical value for the output characteristics be calculated using the at least one first mathematical function based on the adjusted estimated output value at the one or more extreme values;
generating a second mathematical function, wherein the second mathematical function is based on a difference between the empirical output value for the output characteristics and the predicted output value calculated using the assigned mathematical function based on the adjusted estimated output values of the first nodes;
solving the second mathematical function as potential energy of a virtual multidimensional mechanical system to generate optimized output values; and
generating a recipe for controlling the manufacturing apparatus for producing the wafers using the optimized output values.

22. The medium of claim 21, wherein the defining at least one cell further comprises
dividing an input domain into a plurality of cells;
defining one of the plurality of cells as the at least one cell; and
dividing the input domain into a plurality of cells having second nodes, wherein the second nodes characterize an estimated maximum and an estimated minimum of the input parameters,
wherein for the at least one cell all of the second nodes become first nodes.

23. The medium of claim 21, wherein the defining at least one cell further comprises:
defining a maximum value and a minimum value of the input parameters with respect to the at least one cell; and
defining the maximum and minimum values to be the one or more values of the input parameters.

24. The medium of claim 21, wherein one of the output characteristics is a thickness of a region of a layer on a wafer polished by a CMP process.

25. The medium of claim 21, wherein the at least one first mathematical function is a ruled interpolation equation.

26. The medium of claim 21, wherein the second mathematical function is:

$$S = \sum_{i,\forall i} W_i \left( y_i^* - y_i^{predicted} \right)^2$$

-continued with $$\min_{z_k \forall k}^s,$$

where $$y_i^{predicted} = \sum_{(by\,all\,nodes)} \alpha_{ik} z_k,$$

$W_i$—a weight coefficient,
$y_i^{*-}$ an empirical output value at an empirical data point i,
$y_i^{predicted}$—an output value calculated by the mathematical equation,
$z_k$—an output value at node k,
$\alpha_{ik}$—a coefficient that depend solely on the location of point i and node k,
i—an index for an empirical data point, and
k—an index for a node.

27. The medium of claim 26 further comprising:
adjusting a value assigned to the coefficient, $W_1$, based on a precision requirement or when a particular empirical data point is received compared with other empirical data point.

28. The medium of claim 21, wherein solving the second mathematical function comprises:
representing the first and second nodes as free moving bodies each of which is configured to move along a guide, wherein the guide is a fixed unmovable body disposed orthogonally to an input parameter space in which input parameter values are located;
providing a representation of at least one member capable of being attached to springs, the member fixed between two of the free moving bodies;
representing the empirical data points as fixed points in the virtual mechanical system; and
connecting a representation of a spring between at least one of the fixed points and the at least one member to force the member to reach an equilibrium position.

29. The medium of claim 28 further comprising:
representing the free moving bodies as ring-shaped bodies;
representing the fixed unmovable bodies as rods on which the free moving bodies are guided; and
representing the at least one member as a bar tied to the free moving bodies and configured to move in association with movements of the ring-shaped bodies.

30. The medium of claim 28 further comprising:
representing the free moving bodies as ring-shaped bodies;
representing the fixed unmovable bodies as rods on which the free moving bodies are guided; and
representing the at least one member as a surface, corners of which are tied to the free moving bodies and configured to move in association with movements of the ring-shaped bodies.

31. A computer implemented method for generating parameters for a manufacturing apparatus to produce the wafers, the method comprising:
identifying one or more input parameters that cause a change in output characteristics of the wafers produced by the manufacturing apparatus;
defining at least one cell, defined by values of the one or more input parameters, wherein the at least one cell is further defined by one or more extreme values;
assigning at least one first mathematical function to each at least one cell, the at least one first mathematical function configured to generate a predicted output value for a set of values of the input parameters within the assigned at least one cell, wherein the output value numerically represents the output characteristics;
receiving at least one empirical data point having one or more empirical input values for the one or more input parameters and an empirical output value;
using the empirical output value and the predicted output value calculated in conjunction with the at least one first mathematical function using the one or more empirical input values, to adjust the predicted output value;
generating a second mathematical function, wherein the second mathematical function is based on a difference between the empirical output value and the predicted output value;
solving the second mathematical function as potential energy of a virtual multidimensional mechanical system to generate optimized output values; and
generating a recipe for controlling the manufacturing apparatus for producing the wafers using the optimized output values.

* * * * *